F. M. LOCHER.
WINDSHIELD ATTACHMENT.
APPLICATION FILED JAN. 26, 1920.
1,371,496.
Patented Mar. 15, 1921.
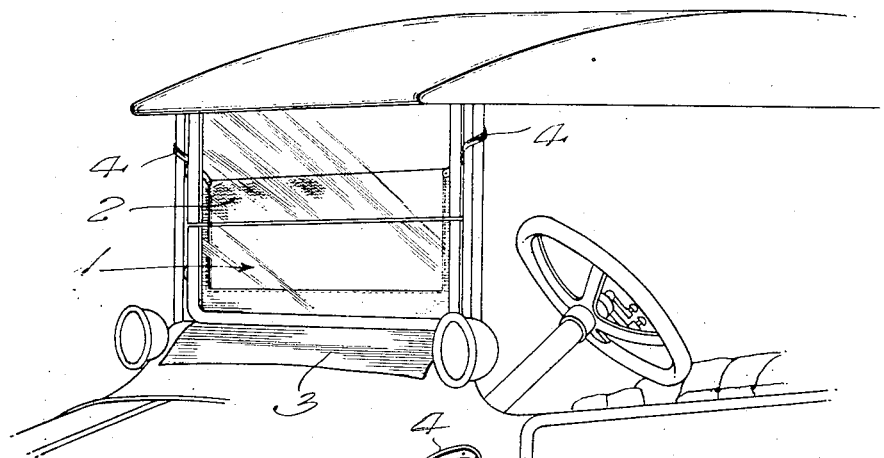
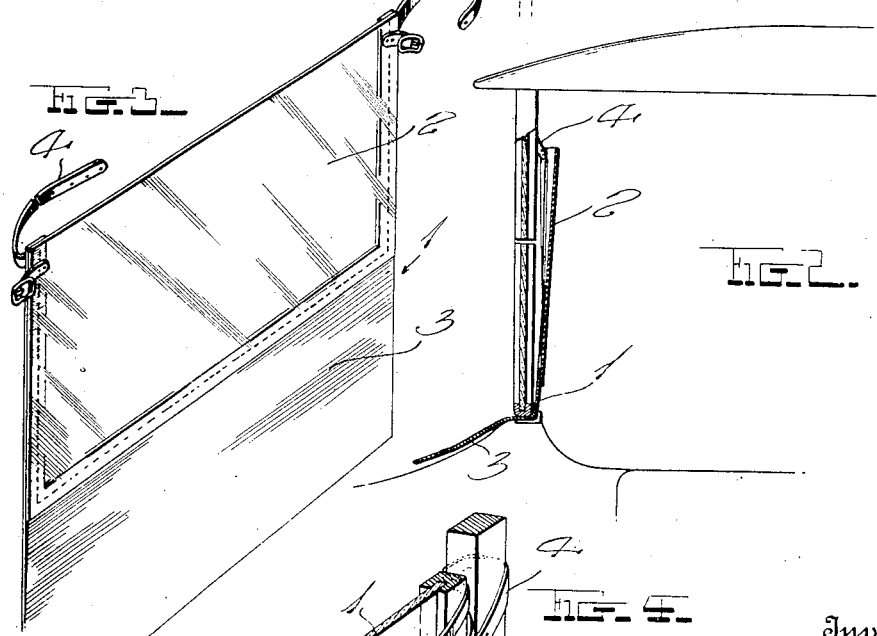
Witness
H. Woodard
Inventor
Felix M. Locher
By H. R. Willson &co
Attorneys

UNITED STATES PATENT OFFICE.

FELIX M. LOCHER, OF VISALIA, CALIFORNIA.

WINDSHIELD ATTACHMENT.

1,371,496.  Specification of Letters Patent.  Patented Mar. 15, 1921.

Application filed January 26, 1920. Serial No. 354,100.

*To all whom it may concern:*

Be it known that I, FELIX M. LOCHER, a citizen of the United States, residing at Visalia, in the county of Tulare and State of California, have invented certain new and useful Improvements in Windshield Attachments; and I do declare the following to be a full, clear, and exact description of the invention, such as will enable others skilled in the art to which it appertains to make and use the same.

This invention relates to improvements in attachments for automobile windshields and the like, and more particularly to a supplemental curtain which is designed to be connected to the windshield to exclude rain.

Automobile windshields at present are, in the majority of cases, made up of two pivotally mounted glass sections which are designed to be moved to a position to admit air into the machine. During rainy weather, it is necessary to sometimes close the sections, but rain driving at certain angles finds its way through the space between the meeting edges of the upper and lower sections of the windshield, thus making it very uncomfortable for the occupants of the car. Devices have been employed to exclude rain and overcome the above circumstances, but these devices are made up of parts which involve considerable expense to both the manufacturer and the user, and even at that, they do not effectively serve the purpose for which they are intended. They are also hard to attach and detach as a rule.

It is therefore the object of this invention to provide an attachment of the above mentioned construction which will effectively prevent entrance of rain into the car at all times and under all circumstances, the attachment being extremely simple in construction, very easy to attach and detach, and being of such construction that it will not obstruct the driver's view and will permit the upper windshield section to be partially opened to admit a small quantity of air, but will at the same time exclude the rain.

Other objects and advantages of the invention may be apparent during the course of the following description.

In the accompanying drawings forming a part of this specification and in which like numerals are employed to designate like parts throughout the same;

Figure 1 is a perspective view of an automobile windshield provided with my improved attachment.

Fig. 2 is a vertical section through the attachment and windshield.

Fig. 3 is a perspective view of an attachment constructed in accordance with my invention.

Fig. 4 is an enlarged detail view of a portion of the windshield, illustrating the manner in which my attachment is secured thereto.

In carrying out my invention I employ a curtain 1 which includes an upper substantially rectangular transparent portion 2, and a lower non-transparent flexible portion 3 provided at its opposite ends with upstanding relatively narrow strips to which the opposite ends of the portion 2 are connected. Each of the sections 2 and 3 is of a width approximately equal to one-half of the entire curtain. These parts may be secured together in any suitable manner. Attaching means 4 is carried by the curtain and is adapted to be connected to one of the vertical uprights of the windshield to partially retain the curtain in position. The attaching means here shown is in the form of straps associated with buckles. While I have shown attaching means of this construction, I desire it to be understood that it may well be of any other construction.

In use, the attachment is placed against the inner surface of the windshield, as shown in Fig. 2. In this position the attaching means 4 is attached to the uprights to support the windshield in a manner similar to that shown in Fig. 4, and the transparent portion of the curtain is supported in a position so as to extend above and below the meeting edges of the upper and lower windshield sections so as to prevent the entrance of water at this point, at which point most of the water gains its entrance. The lower flexible portion 3 of the curtain, which by the way, is composed of suitable waterproof material, is passed forwardly and frictionally clamped between the lower edge of the lower wind shield section and the body of the machine in the manner shown in Figs. 1 and 2. When in this position all rain will be excluded and at the same time, the operator will be permitted to see through the windshield without having his view obstructed. The construction of the attachment is such that it may be readily attached to and detached from operative position, and the materials from which it is composed are flexible so that it may be rolled into a neat bundle after it is detached. Also, the upper windshield section may remain slightly open to admit air and this device will exclude the rain.

With a device constructed in accordance with my invention it will be seen that there are no metal parts to reinforce it, nor are there any specially constructed supporting brackets to be employed with it. The only parts necessary are the flexible transparent, and non-transparent sections, which are provided with any suitable simple constructed attaching means, thus providing a device of extreme simplicity, one which is extremely inexpensive to both the manufacturer and the user.

From the foregoing description taken in connection with the accompanying drawings, it is believed that the manner in which the device is used is obvious, therefore, further description is deemed unnecessary.

It is to be understood that the form of my invention herein shown and described is to be taken as a preferred form of the same, and that various minor changes in the shape, proportions, and arrangement of parts may be resorted to without departure from the spirit of the invention or the scope of the subjoined claim.

I claim:

A rain excluding attachment for disposition against the inner side of an automobile windshield, comprising a substantially rectangular sheet of flexible non-transparent material provided on its upper edge at its opposite ends with relatively narrow upstanding strips, a rectangular sheet of transparent material secured at its lower edge to said upper edge of the first sheet and at its opposite ends to said strips, the upper portion of the latter and said transparent sheet being adapted to extend above the meeting edges of the windshield sections while the lower portion of the first named sheet is intended to extend forwardly and be frictionally held between the lower edge of the lower windshield section and the body of the machine, and means for attaching the upper end of the curtain to the windshield.

In testimony whereof I have hereunto set my hand.

FELIX M. LOCHER.